(12) United States Patent
Shore

(10) Patent No.: US 7,044,482 B2
(45) Date of Patent: May 16, 2006

(54) LOCKING ANTI-MOTION SUSPENSION

(75) Inventor: Daniel B. Shore, Prospect Heights, IL (US)

(73) Assignee: CNH America LLC, New Holland, PA (US)

( * ) Notice: Subject to any disclaimer, the term of this patent is extended or adjusted under 35 U.S.C. 154(b) by 299 days.

(21) Appl. No.: 10/664,568

(22) Filed: Sep. 19, 2003

(65) Prior Publication Data

US 2005/0062239 A1    Mar. 24, 2005

(51) Int. Cl.
*B60G 17/00* (2006.01)
*B60G 11/30* (2006.01)
*B60G 11/56* (2006.01)
*B60G 11/64* (2006.01)

(52) U.S. Cl. .............................. 280/6.157; 280/124.16; 280/124.162

(58) Field of Classification Search ............. 280/6.157, 280/6.15, 6.155, 6.159, 124.157, 124.16, 280/124.162, 5.507, 5.514, 124.158, 124.159, 280/6.153

See application file for complete search history.

(56) References Cited

U.S. PATENT DOCUMENTS

| | | | | | |
|---|---|---|---|---|---|
| 4,186,814 | A | * | 2/1980 | Hart | 180/24 |
| 4,186,815 | A | * | 2/1980 | Hart | 180/41 |
| 5,538,266 | A | * | 7/1996 | Martin et al. | 280/6.154 |
| 6,578,855 | B1 | * | 6/2003 | Wallestad | 280/6.157 |
| 2003/0015847 | A1 | * | 1/2003 | Chatterjea | 280/5.519 |
| 2003/0020252 | A1 | * | 1/2003 | Stanfield | 280/124.161 |

* cited by examiner

*Primary Examiner*—Faye M. Fleming
*Assistant Examiner*—Barry Gooden, Jr.
(74) *Attorney, Agent, or Firm*—Stephen A. Bucchianeri; John William Stader; Michael G. Harms

(57) ABSTRACT

A skid steer vehicle has a suspension that includes a control arm pivotally coupled to the vehicle chassis that is supported by a hydraulic cylinder connected to an accumulator to provide springing. A hydraulic circuit coupled to the cylinder and accumulator permit the operator to raise and lower the chassis, to lock the suspension while the vehicle is loaded, and to automatically charge or discharge the accumulator to match the cylinder pressure during loading and unloading. In this manner, when the suspension is unlocked after loading, the vehicle chassis neither rises nor falls.

14 Claims, 7 Drawing Sheets

LOCKING ANTI-MOTION SUSPENSION

FIELD OF THE INVENTION

The invention relates generally to skid steer vehicles. More particularly, it relates to suspensions for such vehicles. Even more particularly, it relates to suspensions for skid steer vehicles that lock and release.

BACKGROUND OF THE INVENTION

Skid steer loaders were first invented about 30 years ago to fill a need for a small highly maneuverable vehicle that was capable of carrying an implement mounted on loader arms. Skid steer loaders are typically small vehicles, on the order of 10 to 14 feet long, that rest on four or more wheels, at least two of which being disposed on each side of the vehicle.

In order to turn these vehicles, the wheels on opposing sides of the skid steer loader are driven at different speeds. This causes the faster moving wheels on one side to advance that side over the ground faster than the other side on slower moving wheels. The effect is to turn the vehicle toward the wheels on the slower moving side. Since the wheels are not turnable with respect to the vehicle, the vehicle turns by skidding slightly, hence the name "skid steer loader." In the extreme case, the wheels on one side of the vehicle can turn in the opposite direction as the wheels on the other side of the vehicle. They can turn in opposite directions at the same speed or at different speeds. When they turn in opposite directions at the same speed, the skid steer loader will rotate in place about a vertical and generally stationary rotational axis.

This ability to change direction by rotating about an axis within the footprint or perimeter of the loader itself was the primary reason why the skid steer loader achieved its great success.

This mode of turning by skidding permits the skid steer vehicle to operate within confined spaces to provide workers within those spaces the added power that a mobile lifting arm or blade can provide.

The skid steer vehicle is used inside buildings that are under construction or are being fabricated. The skid steer vehicle can carry material and tools quite close to an inside work location right to where workers are fabricating the building, making modifications to the building or other related work. Larger vehicles that have lifting and load-carrying abilities, such as bulldozers, backhoes, front wheel loaders and the like do not have the same ability.

Backhoes with their large rear tires and wide stance cannot easily go through doorways or apertures of buildings that are under construction. Furthermore, their stance is typically too wide to pass through the doorways and their height as well is too large, typically on the order of 10–12 feet off the ground—too large to pass through building doorways or wall openings. Backhoes turn by steering their front wheels with respect to their chassis, giving them a typical turning radius of 25–45 feet, still much too large to use conveniently inside a building Wheel loaders have an extremely wide stance and large bucket, permitting them to carry and move large loads at relatively high speeds over broken ground. Wheel loaders are intended for such locations as road construction sites, rock quarries, steel mills and other outside locations where large capacity, relatively high speed vehicles are beneficial.

Articulated wheel loaders are also constrained by their method of steering: they include two-piece chassis that bend slightly in the middle permitting them to turn in a circle with a radius of about 30–50 feet. This would require an extremely large area in which to turn around, and they would be dangerous in crowded work areas. With a height of about 10–15 feet, they cannot pass through opening or doorways to be used inside buildings to carry tools and supplies and support inside workers.

The only truly practical work-horse for in-building work is the skid steer loader, and it has been used for that purpose for many years. Several of the advantages to skid steer loaders include their low height, typically no more than 8 or 9 feet. This is low enough to permit the vehicle to pass through a doorway under construction or a small breach in a wall of a building under construction.

A further advantage to skid steer vehicles is their narrow width. They are typically less than six feet wide, permitting them to pass though double door ways into commercial buildings under construction. In this manner, they can easily ferry tools and material from larger vehicles and storage areas outside the building into the building itself where they can be delivered to the workers.

A beneficial feature of skid steer vehicles is their ability to turn in place. By turning in place, skid steer vehicles can often avoid backing up at all when inside a building permitting them to maneuver quite carefully through and around work stations, workers, and piles of materials when moving about inside.

Another common feature to skid steer vehicles is their rigid suspension which limits their speed on rough ground. The inherent pitching and rocking causes operator discomfort, loss of vehicle stability, loss of material in the bucket, and potential for catching on to low-hanging obstructions found in buildings under construction, such as beams, electrical wiring, HVAC conduits and the like.

Until recently, skid steer vehicles did not have suspensions for supporting the vehicle. In the last three or four years such suspensions have been developed. The advantage to these suspensions is that they permit the vehicle to go at much greater speeds over broken ground at construction sites. While not rivaling the speed and load-handling capacities of wheel loaders, their added speed makes them more versatile at construction sites. They can now be used for long distance transport of materials and tools over a large construction site. This reduces the need for larger, more expensive vehicles, such as wheel loaders and backhoes. In addition, since they still have the steering by skidding capability and the narrow, short wheelbase, they are still capable of entering into construction sites through open doorways and maneuvering around within constrained spaces.

When a small suspended vehicle like a suspended skid steer loader is loaded and unloaded and when it travels over an irregular surface, the chassis tends to oscillate up and down. In the case of skid steer vehicles the clearance between the chassis and surrounding objects in the building where the skid steer is operated can be significantly reduced. Doorways that were previously passable can interfere with the chassis or other components fixed to and extending therefrom, such as the operator's compartment cage. For example, when the bucket is loaded, the vehicle's suspension compresses and the chassis is lowered toward the ground. This lowers the operator's compartment cage. In this position, lower chassis components are at greater risk of inadvertently hitting the ground or protrusions therefrom. Similarly, when the bucket is unloaded, the chassis raises and upper portions of the chassis and such elements as operator compartment cages may extend upward and interfere with the top of doorways through which the vehicle passes.

In response, operators of a suspended skid steer vehicle must continually gauge the position of the chassis to insure that it will not interfere with its surroundings when the vehicle is loaded or unloaded. This continual checking process, especially when a suspended skid steer vehicle is operated in a confined space such as a building on a construction site, can be difficult. As a result, operators tend to drive slower and approach potential obstructions and restricted spaces at much slower speeds, not just when they initially maneuver around the obstacles, but each and every time they approach them, since the height of the chassis may have changed.

What is needed therefore is some system for locking the chassis suspensions during loading and unloading of the vehicle.

What is also needed is a system that the operator can manually control to insure the chassis is locked when desired and is unlocked when desired.

What is also needed is a system for automatically adjusting chassis height virtually instantly during and after loading and unloading.

What is also needed is a system for automatically maintaining the chassis suspension height to prevent a sudden and unexpected change in height when the chassis suspensions are unlocked.

What is also needed is a system for preventing the chassis from changing height when the skid steer vehicle is loaded and unloaded.

It is an object of this invention to provide one or more of the foregoing features in one or more of the embodiments claimed below.

SUMMARY OF THE INVENTION

In accordance with a first aspect of the invention, a locking anti-motion suspension circuit is provided for a work vehicle having a chassis, a control arm pivotally coupled to the chassis and a ground-engaging wheel coupled to the control arm, the vehicle including at least one hydraulic cylinder that is coupled to and between the control arm and the chassis to control the position of the wheel with respect to the chassis, in which the circuit includes a gas-charged accumulator selectively connectable to the cylinder to absorb vehicular shocks by receiving hydraulic fluid ejected from the cylinder during travel over the ground; a first hydraulic valve controllable to selectively connect the cylinder and the accumulator; a hydraulic tank for receiving exhausted hydraulic fluid; a hydraulic pump configured to provide a supply of pressurized hydraulic fluid; and a second hydraulic valve fluidly coupled to and between the tank and pump and the accumulator, the second valve being responsive to fluid pressure in the cylinder and fluid pressure in the accumulator to maintain the fluid pressure in the accumulator equal to the fluid pressure in the cylinder.

The circuit may include a third hydraulic valve coupled to and between the tank and pump and the cylinder, the third valve being operable to selectively raise the chassis by filling the cylinder from the pump, to lower the chassis by emptying the cylinder to the tank.

The valve may be configured to simultaneously connect the accumulator to the second valve and disconnect the accumulator from the cylinder and to simultaneously connect the accumulator to the cylinder and to disconnect the accumulator from the second valve.

The third valve may be configured (1) to connect the pump to the cylinder when the first valve has disconnected the accumulator from the cylinder, and (2) to connect the pump to both the cylinder and the accumulator when the first valve has connected the cylinder and the accumulator.

The second valve may be pilot operated by hydraulic signals transmitted from the cylinder and by hydraulic signals transmitted from the accumulator, and further wherein the second valve couples the accumulator to the pump when the accumulator pressure is lower than the cylinder pressure, and wherein the second valve connects the accumulator to the tank when the accumulator pressure is higher than the cylinder pressure.

The first valve may be configured to effectively lock the cylinder when it disconnects the accumulator from the cylinder.

The first valve may be manually operable to lock the cylinder and release the cylinder by manually moving a valve element of the first valve from a first position in which flow between the cylinder and the accumulator is blocked and flow between the cylinder and the accumulator is permitted.

In accordance with a second embodiment of the invention, a suspension for a skid steer vehicle having a chassis, is provided, the suspension including a control arm pivotally coupled to the chassis; a ground-engaging wheel coupled to the control arm; and a locking anti-motion hydraulic circuit, the circuit including a hydraulic suspension cylinder coupled to and between the control arm and the chassis to control the position of the wheel with respect to the chassis; a gas-charged accumulator in fluid communication with the cylinder to absorb vehicular shocks and provide suspension springing; a lock/suspend hydraulic valve manually controllable to connect the cylinder and the accumulator; a hydraulic tank for receiving exhausted hydraulic fluid; a hydraulic pump configured to provide a supply of pressurized hydraulic fluid; and a pressure equalization hydraulic valve fluidly coupled to and between the tank and pump and the accumulator to regulate the flow of hydraulic fluid to and from the accumulator, the second valve being responsive to fluid pressure in the cylinder and in the accumulator to maintain fluid pressure in the accumulator equal to fluid pressure in the cylinder.

The suspension circuit may further include a raise/hold/lower hydraulic valve coupled to and between the tank and pump and the cylinder, the raise/hold/lower valve being operable to selectively raise the chassis by filling the cylinder from the pump and to lower the chassis by emptying the cylinder to the tank.

The lock/suspend valve may be configured to simultaneously connect the accumulator to the pressure equalization valve and disconnect the accumulator from the cylinder and to simultaneously connect the accumulator to the cylinder and to disconnect the accumulator from the pressure equalization valve.

The raise/hold/lower valve may be configured (1) to connect the pump to the cylinder when the lock/suspend valve has disconnected the accumulator from the cylinder, and (2) to connect the pump to both the cylinder and the accumulator when the lock/suspend valve has connected the cylinder and the accumulator.

The pressure equalization valve may be pilot operated by hydraulic signals transmitted from the cylinder and by hydraulic signals transmitted from the accumulator, and further wherein the pressure equalization valve couples the accumulator to the pump when the accumulator pressure is lower than the cylinder pressure, and wherein the pressure equalization valve connects the accumulator to the tank when the accumulator pressure is higher than the cylinder pressure.

The lock/suspend valve may effectively lock the cylinder when it disconnects the accumulator from the cylinder.

The lock/suspend valve may be manually operable to lock the cylinder and release the cylinder by manually moving a valve element of the lock/suspend valve from a first position in which flow between the cylinder and the accumulator is blocked and flow between the cylinder and the accumulator is permitted.

In accordance with a third aspect of the invention, a method for controlling a suspension of a skid steer vehicle is provided, the suspension including at least one control arm pivotally attached to a chassis of the vehicle, a hydraulic cylinder coupled to and between the control arm and the chassis, and a gas-charged accumulator in fluid communication with the hydraulic cylinder to provide springing for the control arm, the method including the steps of: connecting the cylinder to the accumulator to suspend the control arm; traveling to a loading location; disconnecting the cylinder from the accumulator to lock the control arm in a fixed pivotal position with respect to the chassis; changing the load on the vehicle such that the hydraulic fluid pressure changes in the cylinder; and automatically and continuously adjusting the accumulator pressure to match the cylinder pressure as the load on the vehicle changes to maintain the vehicle chassis at the same height after loading.

The method may also include the step of automatically and continuously comparing the accumulator pressure to the cylinder pressure as the load on the vehicle changes.

The step of automatically and continuously comparing may include the steps of: applying a cylinder pressure signal to a pressure equalization valve; applying an accumulator pressure signal to the pressure equalization valve in opposition to the cylinder pressure; and moving the pressure equalization valve in response to a difference between the applied cylinder pressure signal and the applied accumulator pressure signal.

The step of automatically and continuously adjusting may include the step of dumping the accumulator to tank when the accumulator pressure signal is greater than the cylinder pressure signal, and filling the accumulator when the accumulator pressure signal is lower than the cylinder pressure signal.

The step of disconnecting the cylinder may include the step of simultaneously connecting the accumulator to the pressure equalization valve while disconnecting the cylinder from the accumulator.

The method may further include the steps of simultaneously connecting the cylinder to the accumulator and disconnecting the accumulator from the pressure equalization valve while maintaining the vehicle chassis at the same height it was at before loading.

BRIEF DESCRIPTION OF THE FIGURES

Preferred exemplary embodiments of the present invention are illustrated in the accompanying drawings in which like reference numerals represent like parts throughout.

DETAILED DESCRIPTION OF THE INVENTION

Figure 1:
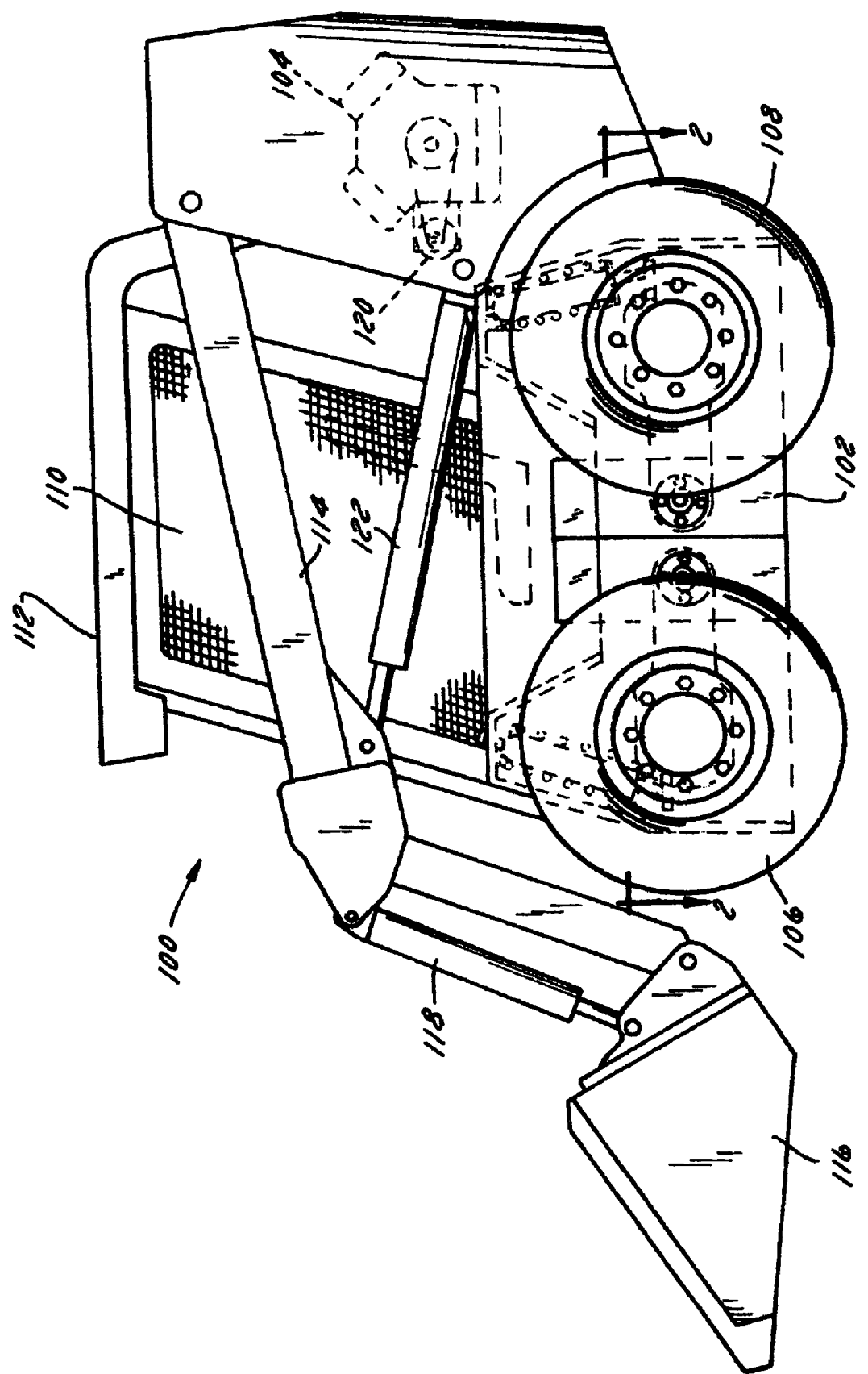
FIG. 1 is a left side view of a skid steer vehicle with a locking suspension in accordance with the present invention.
Figure 2:
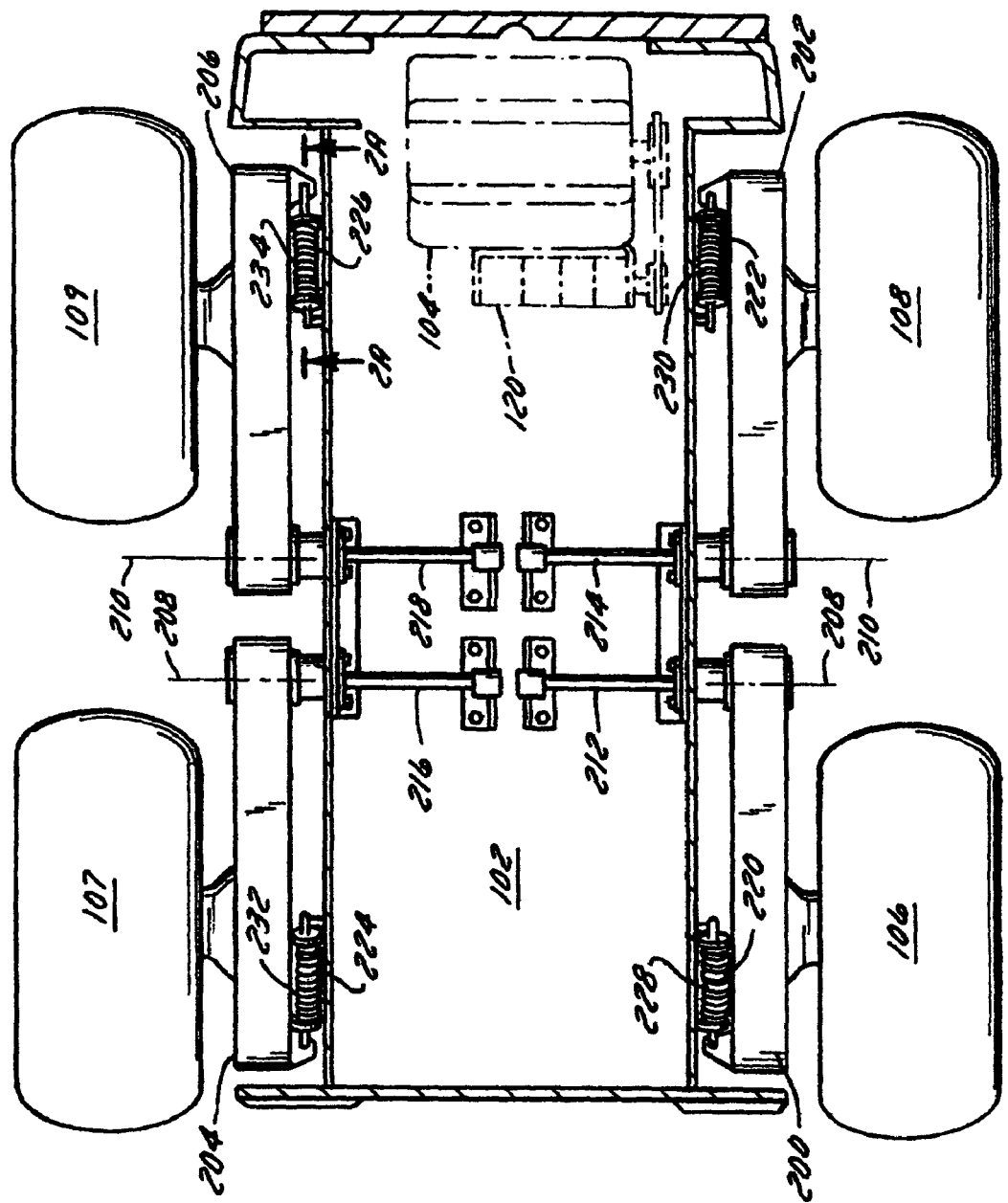
FIG. 2 is a partial cross-sectional plan view of the vehicle of FIG. 1 taken at section line 2—2 in FIG. 1 showing the arrangement of the control arms on either side of the vehicle.

FIGS. 1 and 2 show a skid steer vehicle 100 that has a chassis 102, an engine 104 mounted on the chassis, four wheels including left-side wheels 106, 108 and right-side wheels 107 and 109 (FIG. 2), an operator compartment 110 surrounded by a roll-over protection system 112, a pair of loader lift arms (left-side arm 114 shown in FIG. 1), a loader implement here shown as bucket 116, at least one (and preferably two) bucket cylinder 118, and at least one (and preferably two) loader arm lift cylinder 122.

The wheels 106, 107, 108, and 109 may have solid or pneumatic tires. The wheels need not contact the ground directly, but may be wrapped by continuous belts or tracks (not shown). One of these tracks may extend around wheels 106 and 108 on one side of the vehicle and be driven thereby. The other track may extend around wheels 107 and 109 on the other side of the vehicle and be driven thereby.

The operator compartment 110 is preferably defined by a cage, having a plate for a roof and expanded metal mesh on its rear, left and right sides. The front of the compartment is preferably open to permit the operator easy entry and egress.

The chassis is preferably formed of several steel sheets that are welded or bolted together to form what resembles a rectangular bucket having four sidewalls, a floor pan and an open top in which the engine, hydraulic drive pumps and drive motors are mounted.

Engine 104 is coupled to and drives several hydraulic drive pumps 120 (FIGS. 1 and 2) that provide hydraulic fluid under pressure. This fluid is used to drive the vehicle over the ground and to operate the hydraulic cylinders. The hydraulic cylinders, in turn, raise and lower the loader arms and tilt the bucket.

FIG. 2 is a plan view of the chassis in partial cross-section, the section being taken at Section line 2—2 in FIG. 1. FIG. 2 illustrates the arrangement of the vehicle suspension system and the wheels in relation to the vehicle's chassis, engine and hydraulic drive pumps.

The vehicle suspension system includes left front, left rear, right front and right rear control arms 200, 202, 204, and 206, respectively. Each control arm is pivotally coupled to the chassis to pivot about a generally lateral or side-to-side axis. The two front control arms pivot about a common front lateral pivotal axis 208 and the two rear control arms pivot about a generally lateral pivotal axis 210. Each control arm is coupled to the chassis by spherical bearings or bushings coupled to the rear end of the forward control arms and to the front end of the rear control arms. The control arms extend in a generally horizontal plane, such that the axis of the wheel on the control arm (i.e. the axis about which the wheel rotates with respect to the control arm) is at the same height as the lateral pivotal axis of the control arm when the suspension is at its central position and preferred operating height as shown in FIG. 1.

Each control arm includes a spring means to support the vehicle. The spring means extends between and is coupled to the chassis and the control arm. Each control arm may have one or more spring means. In the embodiments of FIGS. 1 and 2, three different potential spring means are illustrated with each control arm. The first spring means includes torsion springs 212, 214, 216 and 218 that are coupled at their outboard ends to their respective control arms where the control arms are pivotally coupled to the vehicle. The inboard ends of the torsion springs are coupled to the chassis of the vehicle. When the control arms pivot about their pivotal axes, they twist the outboard ends of their respective control arms. The torsion springs support the vehicle on the control arms.

The second spring means illustrated for each control arm is a linear spring, here shown as coil springs 220, 222, 224, and 226 that are coupled to and between the free end of the control arms and the chassis.

The third spring means illustrated for each control arm are hydraulic cylinders 228, 230, 232, 234 that are filled with hydraulic fluid and coupled to a gas charged accumulator (see FIGS. 3–6 for the accumulators) to provide the springing. These accumulator/cylinder arrangements are discussed in more detail in conjunction with FIGS. 3–6, below. What should be understood is that hydraulic cylinders alone can be used to support and provide springing for the vehicle, or alternatively any of the mechanical spring arrangements, such as the torsion spring, the coil spring, or even a flexible elongated spring such as a leaf spring, may be used in conjunction with the cylinder/accumulator spring means that is discussed below. Alternatively, any or all of the illustrated springs (other than the cylinder/accumulator arrangement) can be eliminated.

Figure 3:
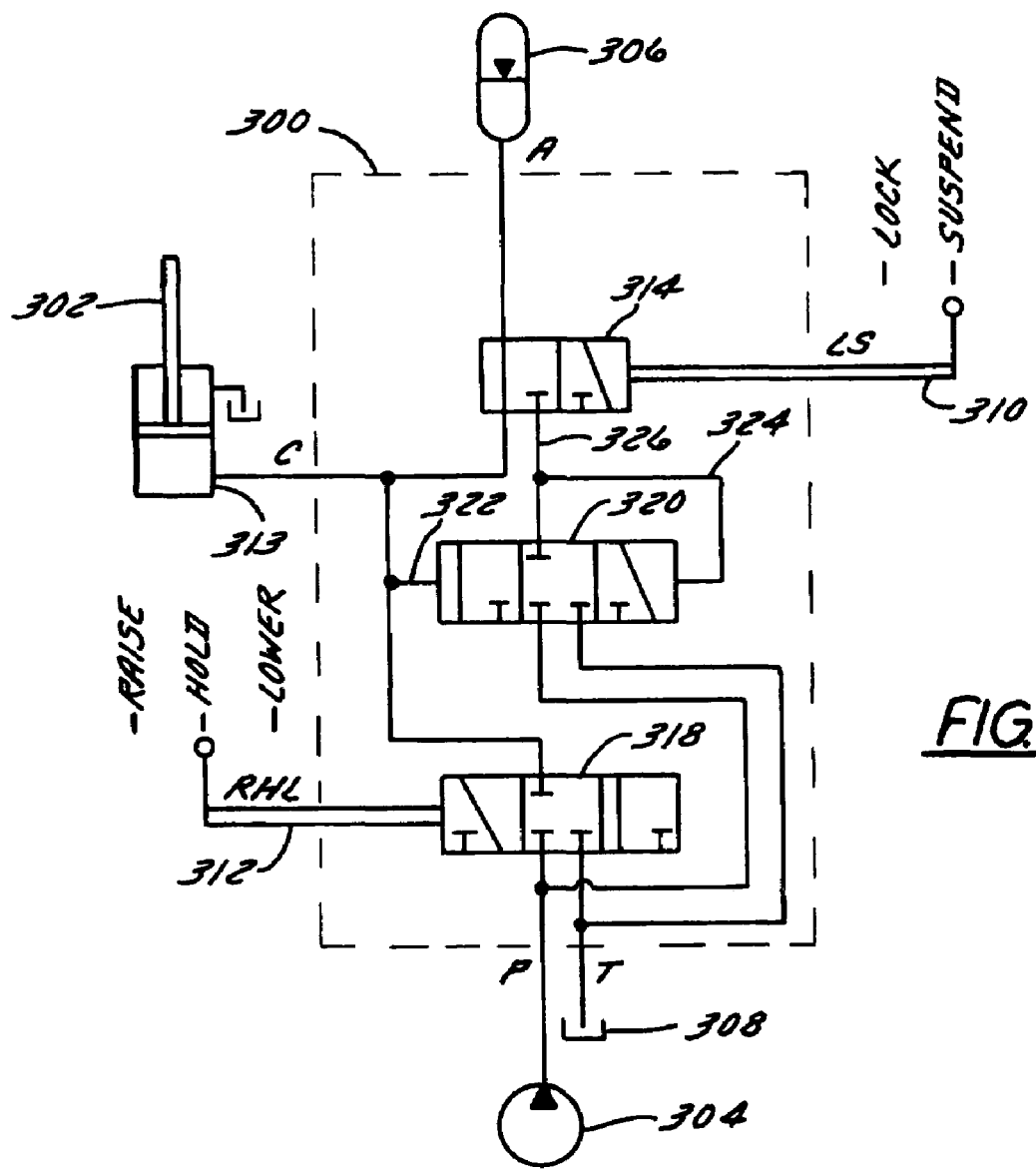
FIG. 3 is a hydraulic circuit diagram illustrating a hydraulic suspension circuit of the vehicle of FIGS. 1 and 2.
Figure 2A:
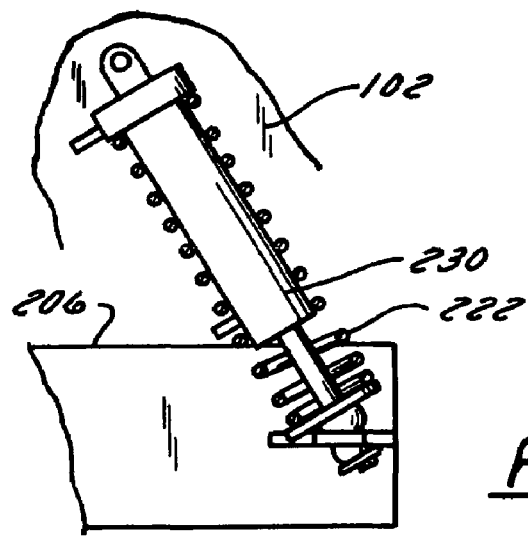
FIG. 2A is a fragmentary view taken generally along line 2A—2A in FIG. 2 showing the right rear suspension cylinder and spring of the vehicle of FIGS. 1 and 2

FIG. 3 shows a hydraulic circuit that controls the height of the suspension, locking and unlocking it and balancing any applied load automatically by applying an opposing spring force to compensate for the changing applied load.

The "applied load" is the changing work load that the operator applies to the vehicle chassis by loading and unloading the vehicle, typically by filling and emptying the bucket, or lifting and lowering some device attached to the loader arms. The applied opposing spring force is the variable force that is generated by charging or discharging the accumulator.

FIG. 3 shows a hydraulic circuit 300 coupled to a suspension cylinder 302, to hydraulic pump 304, to gas-charged accumulator 306, and to tank 308. The circuit can be controlled by lock/suspend actuator 310, and raise/lower/hold actuator 312. Functional hydraulic pump symbol 304 is not limited to a pump, per se, but represents any regulated source of hydraulic fluid under pressure.

Suspension cylinder 302 can be any one of the suspension cylinders 228, 230, 232, 234 shown in FIG. 2 that supports the skid steer vehicle. It is a hydraulic cylinder with at least one port 313 through which hydraulic fluid can be introduced and withdrawn. When hydraulic fluid under pressure is forced into the cylinder, it extends responsively.

Circuit 300 includes hydraulic valve 314, which alternatively connects and disconnects accumulator 306 to port 313 of cylinder 302. Cylinder 302 may be locked in position by disconnecting it from accumulator 306. When valve 314 connects accumulator 306 to cylinder 302, it provides springing to the suspension.

For this reason, valve 314 is called the "lock/suspend valve". It is actuated by lock/suspend actuator 310. This actuator, as illustrated here, may be a mechanical actuator. Alternatively, it may include an electrical, pneumatic or hydraulic actuator.

Circuit 300 includes hydraulic valve 318, which alternatively (1) connects cylinder 302 to the output of hydraulic supply pump 304 to raise the chassis 102 and extend cylinder 302, (2) disconnects cylinder 302 from tank 308 and pump 304, and (3) connects cylinder 302 to tank 308 to drain cylinder 302 and lower chassis 102.

In this manner, hydraulic fluid under pressure can be forced into cylinder 302 from pump 304 or can be removed from cylinder 302 and permitted to drain back to tank 308. This insertion and removal causes the suspension cylinder 302 to extend or retract, and therefore chassis 102 at that suspension cylinder to raise or lower.

When valve 318 is in its third position, its "hold" position, it prevents all flow of fluid between the cylinder and the tank and pump.

For these reasons hydraulic valve 318 is called the "raise/hold/lower valve". Like the lock/suspend valve, the raise/hold/lower valve 318 is shown in FIG. 3 as a manually actuated valve. It, like lock/suspend valve 314, may also be actuated by electrical, pneumatic or hydraulic means.

Circuit 300 also includes hydraulic valve 320, which is coupled to the tank and pump, and to accumulator 306. This valve is not operated manually, but is automatically actuated by control signals provided on signal lines 322 and 324. Signal line 322 is fluidly coupled to cylinder 302 and conducts fluid pressure from cylinder 302 to the one end of valve 320. This tends to push valve 320 to the right (in the figure). The force applied by the pressure in cylinder 302 is opposed by an opposite force applied by hydraulic pressure transmitted over signal line 324. Signal line 324, in turn, is coupled to the fluid conduit 326 that is coupled to and between valve 320 and valve 314.

When cylinder pressure in signal line 322 is greater than accumulator pressure in signal line 324, the difference in pressure acting on valve 320 shifts valve 320 to the right, connecting hydraulic pump 304 to valve 314 via conduit 326.

When accumulator pressure in signal line 324 is greater than cylinder pressure in signal line 322, the pressure difference shifts valve 320 to the left, connecting tank 308 to valve 314 via conduit 326.

In the positions shown in FIG. 3, the shifting of valve 320 has no effect on the raising, lowering, holding, locking, and suspending of the suspension and suspension cylinder. Valve 320 is operable when the suspension is locked—i.e. when valve 314 is shifted from its illustrated "suspend" position to the alternative "lock" position. When valve 314 is in its "lock" position, accumulator 306 is blocked off from cylinder 302 and is connected to hydraulic conduit 326.

In the "lock" position of valve 314, cylinder 302 cannot extend or retract when changing loads are applied to cylinder 302. With the fluid path to accumulator 306 blocked, (and with the raise/hold/lower valve 318 in the illustrated "hold" position) no fluid can enter or leave cylinder 302. Cylinder length is fixed, and no change in chassis load, no increase or decrease in force applied to cylinder 302 will permit it to move. Increasing or decreasing the load on cylinder 302 merely increases or decreases the pressure in cylinder 302 and signal line 322.

When additional load is placed on cylinder 302 and valve 314 is in the "lock" position, the pressure in cylinder 302 increases, but the cylinder does not move. This increased pressure is communicated through signal line 322 to the end of valve 320, which responsively shifts to the right. When valve 320 shifts to the right, it fluidly connects the accumulator 306 to the output of pump 304.

Pump 304 is configured to provide hydraulic fluid at a significantly higher pressure than the pressure in cylinder 302 and accumulator 306. As a result, when accumulator 306 is connected to pump 304, the pump generates sufficient pressure to force hydraulic fluid into accumulator 306 through conduit 326.

As the accumulator fills, the incoming fluid pressurizes the gas inside the accumulator thereby increasing accumulator pressure. This increasing pressure is fluidly communicated through signal line 324 to the right end of valve 320.

As the pressure on the right end of valve 320 rises, it eventually reaches the point that it just balances the pressure applied to the left end of valve 320 by cylinder 302, and valve 320 moves to the illustrated middle (or neutral) position in which flow to and from the accumulator is blocked.

In a similar fashion a decrease in cylinder pressure causes valve 320 to shift to the left, connecting conduit 326 to tank 308, dumping hydraulic fluid from the accumulator until accumulator pressure matches the reduced pressure in the cylinder. The drop in pressure occurs when hydraulic fluid in the accumulator leaves the accumulator, passes through conduit 326 and returns back to hydraulic tank 308.

In this manner, hydraulic circuit 300 automatically charges and discharges the accumulator while the suspension is locked such that the accumulator pressure matches the suspension cylinder 302 pressure.

Circuit 300 therefore automatically maintains the pressure in the accumulator equal to the cylinder pressure by continually raising accumulator pressure and lowering accumulator pressure to match the cylinder 302 pressure.

Circuit 300 does this even when the operator shifts valve 318 to its "raise" or "lower" positions. Valve 320 automatically matches the cylinder and accumulator pressure until valve 314 is moved to its "suspend" position by actuator 310.

This pressure equalization is sufficiently fast that the operator when locking and unlocking the suspension, and when loading at his typical rate of speed is unable to unlock the suspension fast enough to cause a sudden rise or fall of the suspension due to mismatched accumulator and cylinder pressures.

In practice, the components of circuit are preferably sized such that the pressure is changed in the accumulator so the vehicle neither raises (due to accumulator pressure higher than the pressure in the cylinder 302) or drops (due to accumulator pressure lower than the pressure in the cylinder 302) when the operator ceases loading or unloading and releases the suspension (i.e. shifts the suspension from "locked" to "suspend" modes of operation).

In FIG. 3, hydraulic circuit 300 is shown coupled to a single cylinder, single tank, single pump and single accumulator to illustrate the principle of operation of circuit 300. The suspension system for a vehicle using circuit 300 may be more complicated since such a vehicle would typically have several of these hydraulic cylinders to be locked, unlocked, and several control arms whose heights are controlled by controlling the length of the hydraulic suspension cylinders. The present vehicle is no exception. Several such hydraulic suspension systems using multiple cylinders and accumulators in various configurations are illustrated in FIGS. 4 to 7C.

In the circuit of FIG. 3, each connection to the circuit is identified with a letter for convenience. The letters "P", "T", "A", "LS", "C" and "RHL" stand for connections to the pump, tank, accumulator, lock/suspend actuator, suspension cylinder and raise/hold/lower actuator of circuit 300. These same connections to internal circuit 300 elements are shown for each hydraulic circuit 300 shown in FIGS. 4–7C as well, as a substitute for the circuit details shown in FIG. 3. Showing the additional circuit details in FIGS. 4–7C would clutter the drawings, making them difficult to read, and therefore they are implied by the external labeled connections.

There are several preferred methods of operating the circuit of FIG. 3. When the operator moves the vehicle over the ground carrying a load from one place to another, he may place the circuit either in the suspend mode (i.e. the lock/suspend actuator 310 and valve 314 in the "suspend" position), in which case cylinder 302 is sprung and acts to damp the oscillation of the suspension, or he may have it in the locked mode (i.e. the lock/suspend valve 314 and actuator 310 are in the "lock" position).

When the operator arrives at a location where he will load or unload the vehicle, he preferably places valve 314 in the "lock" position and begins loading or unloading. As the vehicle load changes in the lock position, cylinder pressure changes, causing circuit 300 to automatically charge or discharge the accumulator to the identical pressure.

Once the operator finishes loading or unloading, he then switches the circuit to the suspend mode using actuator 310 to move valve 314 to the "suspend" position. This reconnects the accumulator to cylinder 302. Since the accumulator is at the same pressure as the cylinder, the vehicle chassis neither raises nor lowers. Hydraulic fluid neither flows from the cylinder into the accumulator nor from the accumulator into the cylinder. Instead, the vehicle sits at the same height it was at when the operator started loading the vehicle. With the vehicle at the same height, but with a changed load, the operator can then travel over the ground to the next location carrying the vehicle's new load with the assurance the vehicle is at the same height it had before the load was changed.

On occasion, the operator may wish to raise or lower the chassis of the vehicle with respect to the ground, perhaps to prevent the bottom of the chassis from striking a bump or ridge, or to go through a doorway without striking the top of the doorway.

In order to do this, the operator manipulates the raise/hold/lower actuator 312 and valve 318 to either fill or empty cylinder 302. The operation of valve 320 is independent of the cylinder's position.

Circuit 300 is therefore capable of changing the height of the chassis above the ground to any of several different operator-selected heights. It is capable of adjusting an accumulator charge to equal a pressure change in a suspension cylinder even when the suspension cylinder is not coupled to the accumulator to prevent sudden change in chassis height when the suspensions are released or unlocked.

Figure 4:
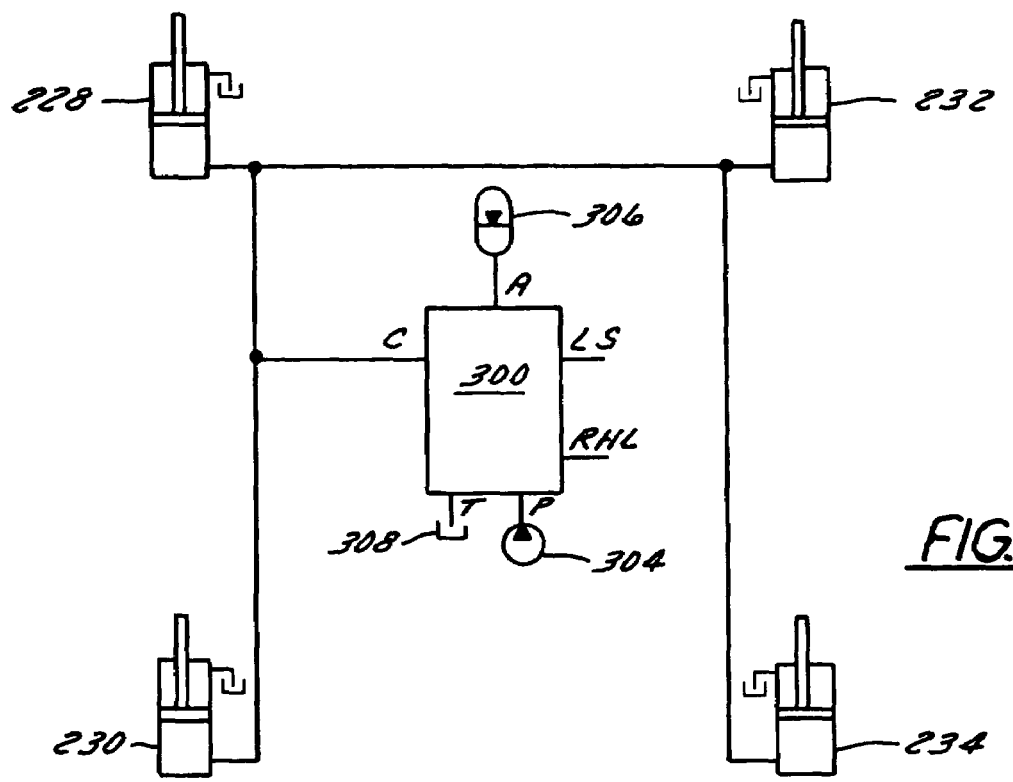
FIG. 4 is a hydraulic circuit diagram of the suspension circuit of FIG. 3 coupled in parallel to all four suspensions of the vehicle of FIGS. 1 and 2.

FIG. 4 illustrates an embodiment of the vehicle's suspension system in which a single circuit 300 is coupled to each of four suspension cylinders 228, 230, 232, and 234. As explained above, cylinder 302 represents any of the vehicle's suspension cylinders, and in the particular embodiment of FIG. 4, all of the suspension cylinders are coupled to the cylinder connection "C" of circuit 300. The operation of this system, both internally by the valves and conduits, and externally by the operator is the same in every respect as the arrangement of FIG. 3 with one change: the circuit is coupled to several suspension cylinders at the same time and thus maintains all the cylinders collectively at the same cylinder pressure.

The FIG. 4 arrangement is particularly useful in vehicles having suspensions that are not completely independent, suspensions that have some mechanical linkage between them such as an anti-sway bar or similar device that transfers the load from one suspension to another, or vehicles that have a single load that is placed in such a location that all of the suspensions are generally equally loaded.

In the embodiment of FIG. 4, the operator manipulates the suspension actuators 310 and 312 and loads or unloads the vehicle in the same manner described in conjunction with FIG. 3. In the embodiment of FIG. 4, this loading or unloading automatically loads all of the suspension cylinders at once. The increased or decreased pressure of this loading or unloading is communicated to valve 320 in exactly the same manner as in the example of FIG. 3, and the accumulator charged or discharged in the same way. The embodiment shown here uses a single accumulator or several accumulators connected together in parallel.

Figure 5:
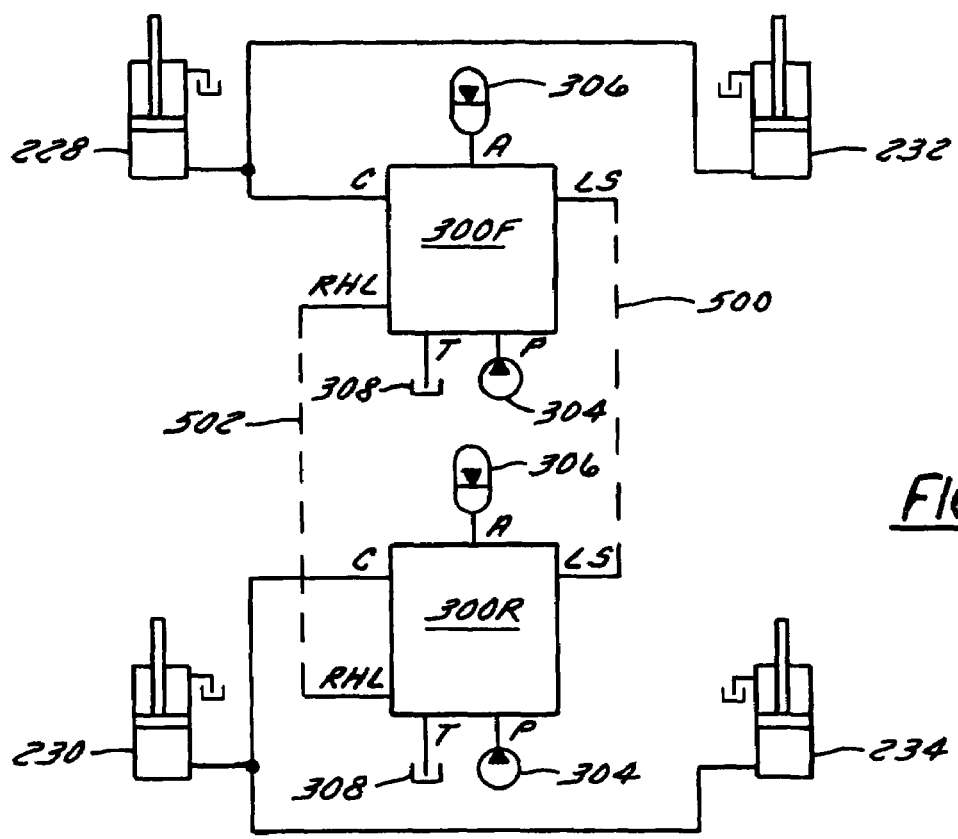
FIG. 5 is a hydraulic circuit diagram of a first and a second hydraulic suspension circuit of FIG. 3 coupled to the front and the rear suspensions of the vehicle of FIGS. 1 and 2, respectively.

FIG. 5 illustrates yet another arrangement of the suspension system that uses a pair of circuits 300 to respectively control two front and two rear suspensions. In the embodiment of FIG. 5, the first circuit 300 (identified as "300F") is connected to front hydraulic suspension cylinders 228 and 232. The second circuit 300 (identified here as "300R") is connected to rear hydraulic suspension cylinders 230, 234. This arrangement is particularly well suited to vehicles in which the load is equally distributed along the longitudinal centerline of the vehicle, not favoring one side over another. Multiple pump symbols 304 are used in FIG. 5. While multiple pump symbols are used, multiple pumps are not required. Each of these symbols represents the point at which a regulated source of hydraulic fluid under pressure is connected. Multiple accumulator symbols 306 are used in FIG. 5. Each of these symbols represents a discrete accumulator or group of accumulators. Thus, in FIG. 5, at last two discrete accumulators are required, one connected to each of the circuits 300.

The operator manipulates actuators 310, 312 in the same preferred manner described above in conjunction with FIGS. 3 and 4 to lock or suspend the front and rear suspensions and to raise the chassis, hold the chassis at a particular height or lower the chassis using the raise/hold/lower actuator and valve.

In the embodiment of FIG. 5, however, the operator need not raise, lower, hold, lock, or suspend all the suspensions at once as shown in FIG. 4. Instead, by separately actuating the front circuit 300F and the rear circuit 300R he can set the front and rear chassis heights independently, and can lock the front and rear suspensions independently. The front end of the chassis may be above, at the same height as, or below the height of the rear chassis. The front suspension may also be unlocked while the rear suspension is locked and vice versa, and such that both front and rear suspensions may be locked and both front and rear suspensions may be unlocked (i.e. suspended). This additional flexibility of operation permits the operator to compensate for loads that do not act equally on all four suspensions, but load the front more than the rear suspensions, or vice versa.

When the front suspensions are loaded more than the rear suspensions, the pressure increases in the front cylinders more than in the rear cylinders. As a result, valve 320 of circuit 300F opens wider and for a greater period of time, thereby filling the front accumulator 306 more than rear accumulator 306.

The pressure in the front accumulator will be greater than the pressure in the rear accumulator, and the front suspension cylinders will hence have a greater pressure than the pressure in the rear cylinders. As should be clear from the circuit diagram of FIG. 5, the pressure in the two front cylinders 228, 232 will be equal, and the pressures in the two rear cylinders 230, 234 will be equal, although these front and rear pressures may be different.

The system of FIG. 5 is therefore configured to provide front and rear cylinders with different hydraulic pressures, while simultaneously maintaining the same pressure in the front and the same pressure in the rear cylinders.

The lock/suspend actuators of circuits 300F and 300R are linked together to be simultaneously operable by the vehicle operator as shown by the dashed line 500 that extends between the two actuators. This coupling together may be provided by a mechanical, pneumatic, hydraulic or electrical linkage coupling the two actuators. Linkage 500 can be separated by the operator to permit the actuators to be separately manipulated. The operator can therefore operate the lock/suspend actuators simultaneously when they are linked together, and operate them individually and independently when linkage 500 is disconnected.

The raise/hold/lower actuators of circuits 300F and 300R are linked together for simultaneous operation as indicated by dashed line 502 coupling the two together. This coupling may be provided by a mechanical, pneumatic, hydraulic or electrical linkage coupling the two actuators. Linkage 502 may be separated by the operator to permit the actuators to be separately manipulated. The operator can therefore operate the raise/hold/lower actuators simultaneously when they are linked together, and operate them individually and independently when the linkage 502 is disconnected.

Figure 6:
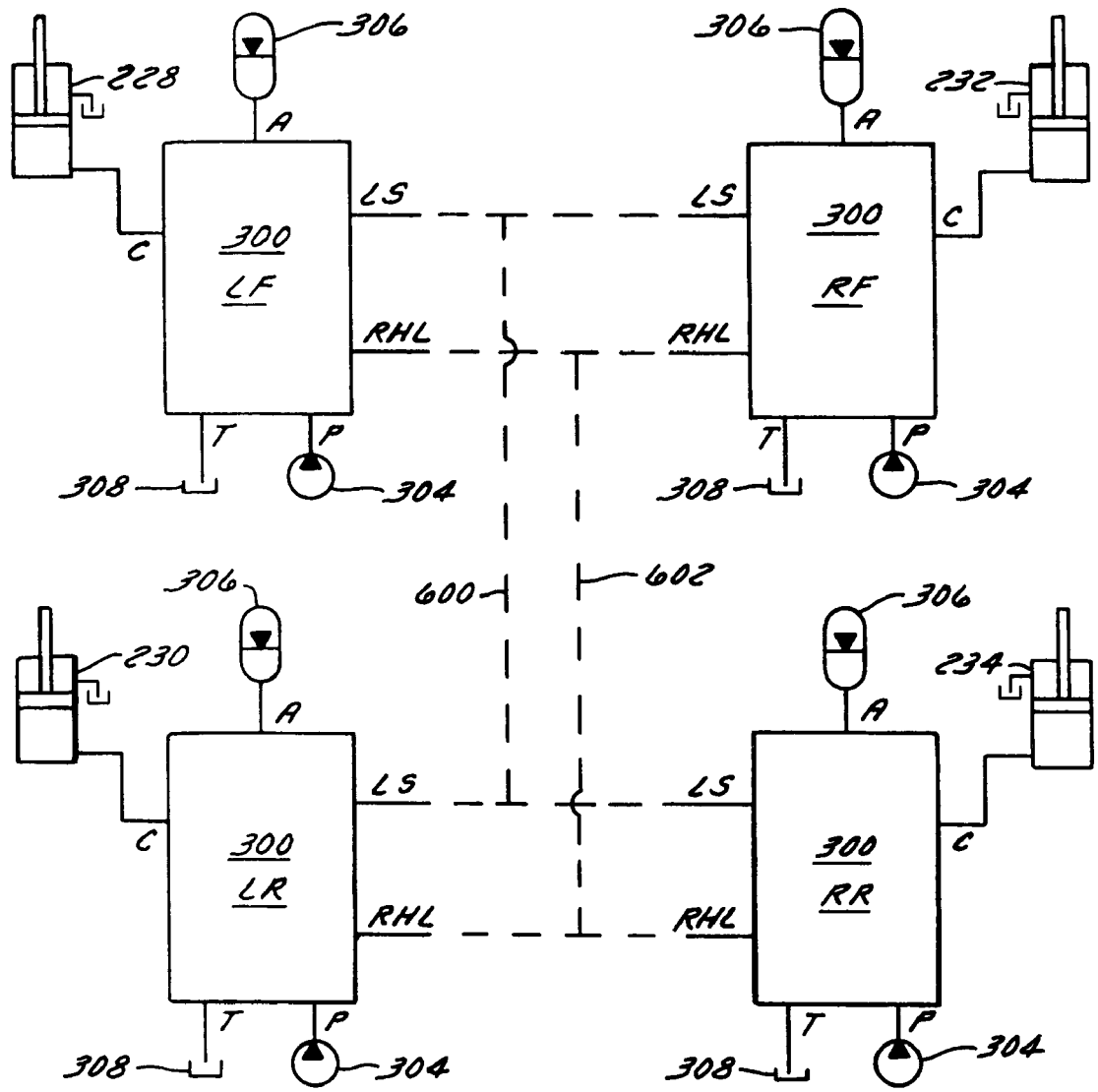
FIG. 6 is a hydraulic circuit diagram of four hydraulic suspension circuits of FIG. 3, each of the four circuits being connected to a corresponding one of the four suspensions of the vehicle of FIGS. 1 and 2.

FIG. 6 illustrates yet another embodiment of the suspension system in which each of the four suspensions—left front, right front, left rear and right rear—of vehicle 100 has its own associated circuit 300. These circuits are identified here as 300LF, 300RF, 300LR, and 300 RR, for the left front, right front, left rear and right rear suspensions, respectively. Multiple pump symbols 304 are used in FIG. 6. While multiple pump symbols are used, multiple pumps are not required. Each of these symbols represents the point at which a regulated source of hydraulic fluid under pressure is connected. Multiple accumulator symbols 306 are used in FIG. 6. Each of these symbols represents a discrete accumulator or group of accumulators. Thus, in FIG. 6, at last four discrete accumulators are required, one connected to each of the circuits 300.

In the system of FIG. 6, each cylinder 228, 230, 232, 234 is supplied with its own circuit 300, providing independent control of the height of each suspension. This arrangement is suited to a vehicle such as a skid steer loader, which commonly has a different load applied to each wheel.

A different load at each wheel requires a different spring force at each wheel to support the chassis at each wheel. The different spring forces at each wheel are generated by different hydraulic cylinder pressures in each suspension cylinder 228, 230, 232, and 234. The way to provide different hydraulic cylinder pressures is by providing each suspension cylinder—each wheel—with its own independently and separately controllable circuit 300 for pressurizing its associated accumulator, as shown in FIG. 6.

When different loads are applied to each wheel, each wheel (and hence the suspension cylinder and associated accumulator that support each wheel) should be separately and independently pressurized in order to hold the chassis at the same desired height when an unequal load is applied to the four suspension cylinders 228, 230, 232, 234. The examples of FIGS. 4–5 do not provide that complete independence. The system illustrated in FIG. 6 does provide that independence, unlike the examples of FIGS. 4–5.

The lock/suspend actuators of circuits 300RF, 300LF, 300RR, and 300LR are coupled together as shown by the dashed line linkage 600 that extends between the four actuators. By coupling them together they are simultaneously operable by the vehicle operator. This coupling may be provided by mechanical, pneumatic, hydraulic or electrical linkages coupling the four actuators.

Linkage 600 can be separated by the operator to permit the lock/suspend actuators of circuits 300RF, 300LF, 300RR, and 300LR to be individually and separately manipulated by the operator. The operator can therefore operate the lock/suspend actuators of circuits 300RF, 300LF, 300RR and 300LR simultaneously if they are linked together, or operate them individually and independently if the linkage 600 is disconnected.

The raise/hold/lower actuators of circuits 300RF 300LF, 300RR, and 300LR are similarly coupled together for simultaneous operation as indicated by dashed line linkage 602 coupling the four together. This may be provided by mechanical, pneumatic, hydraulic or electrical linkages coupling the four actuators.

Linkage 602 can be separated by the operator to permit the raise/hold/lower actuators of circuits 300RF, 300LF, and 300RR, and 300LR to be individually and separately manipulated by the operator. The operator can therefore operate the raise/hold/lower actuators of circuits 300RF, 300LF, 300RR, and 300LR simultaneously if they are linked together,or operate them individually, separately, and independently if linkage 602 is disconnected.

Figure 7A:
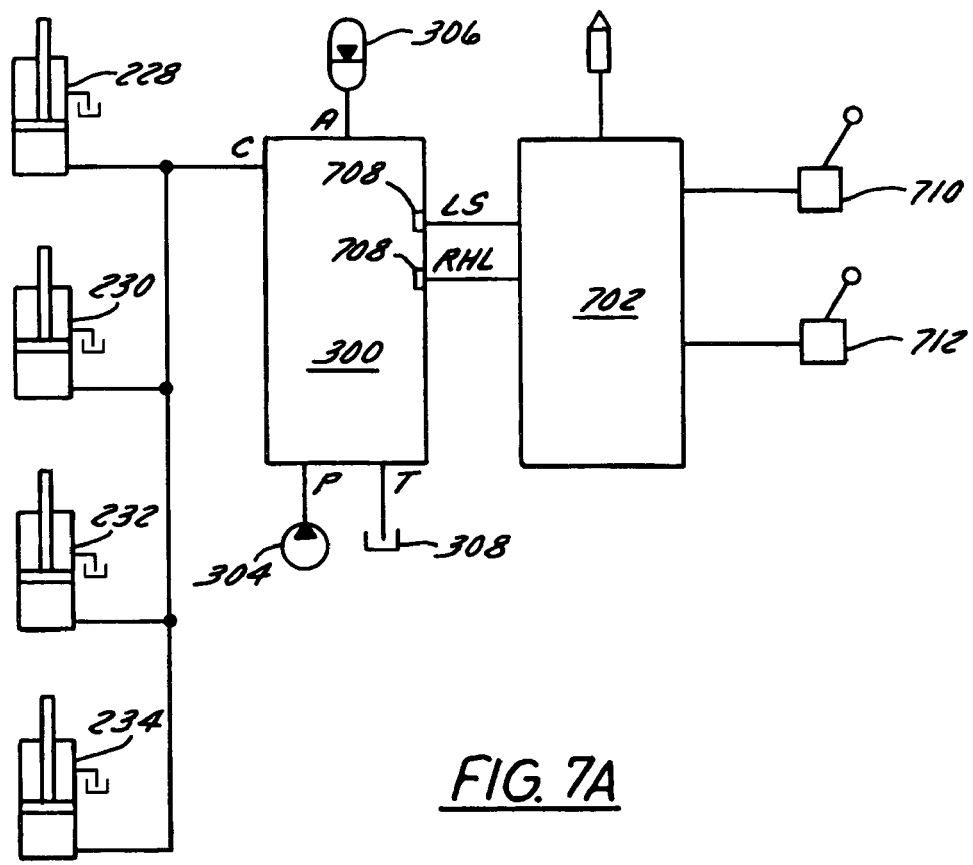
FIGS. 7A, 7B, and 7C are electronic and hydraulic circuit diagrams of the circuits of FIGS. 4, 5, and 6 modified to use a pre-programmed digital microprocessor-based microcontroller to actuate the circuits 300 of FIGS. 4–6 in place of the mechanical actuators shown in FIGS. 4–6.
Figure 7B:
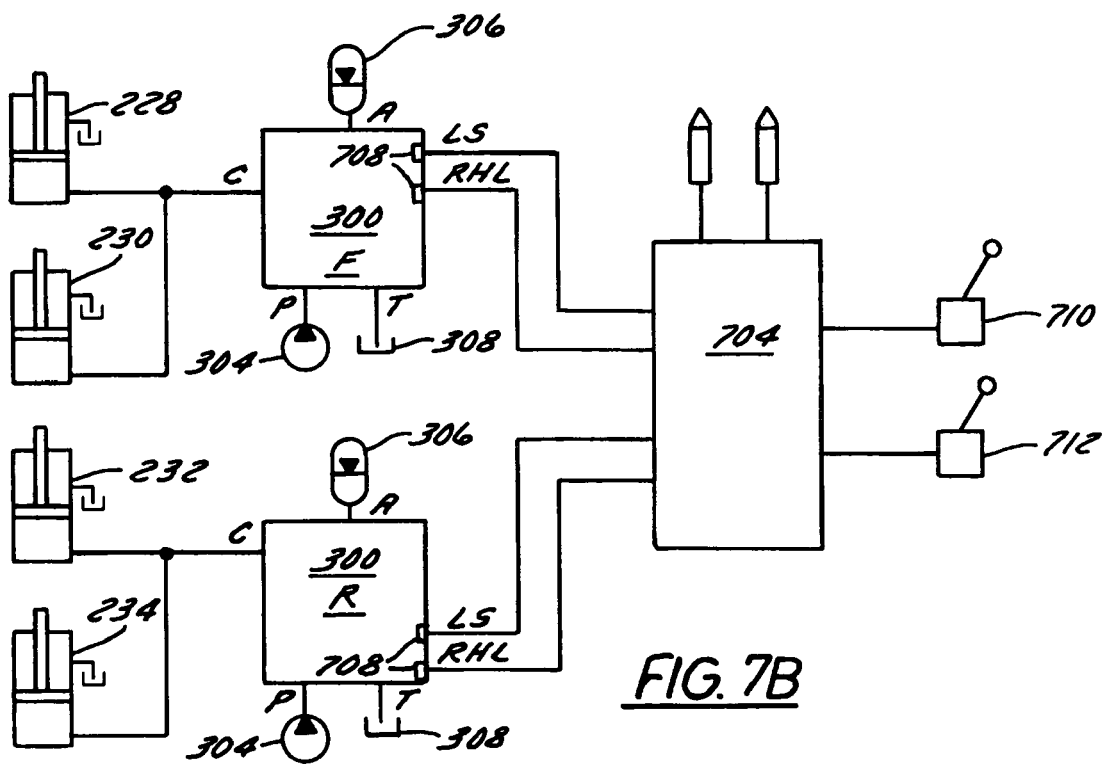
Figure 7C:
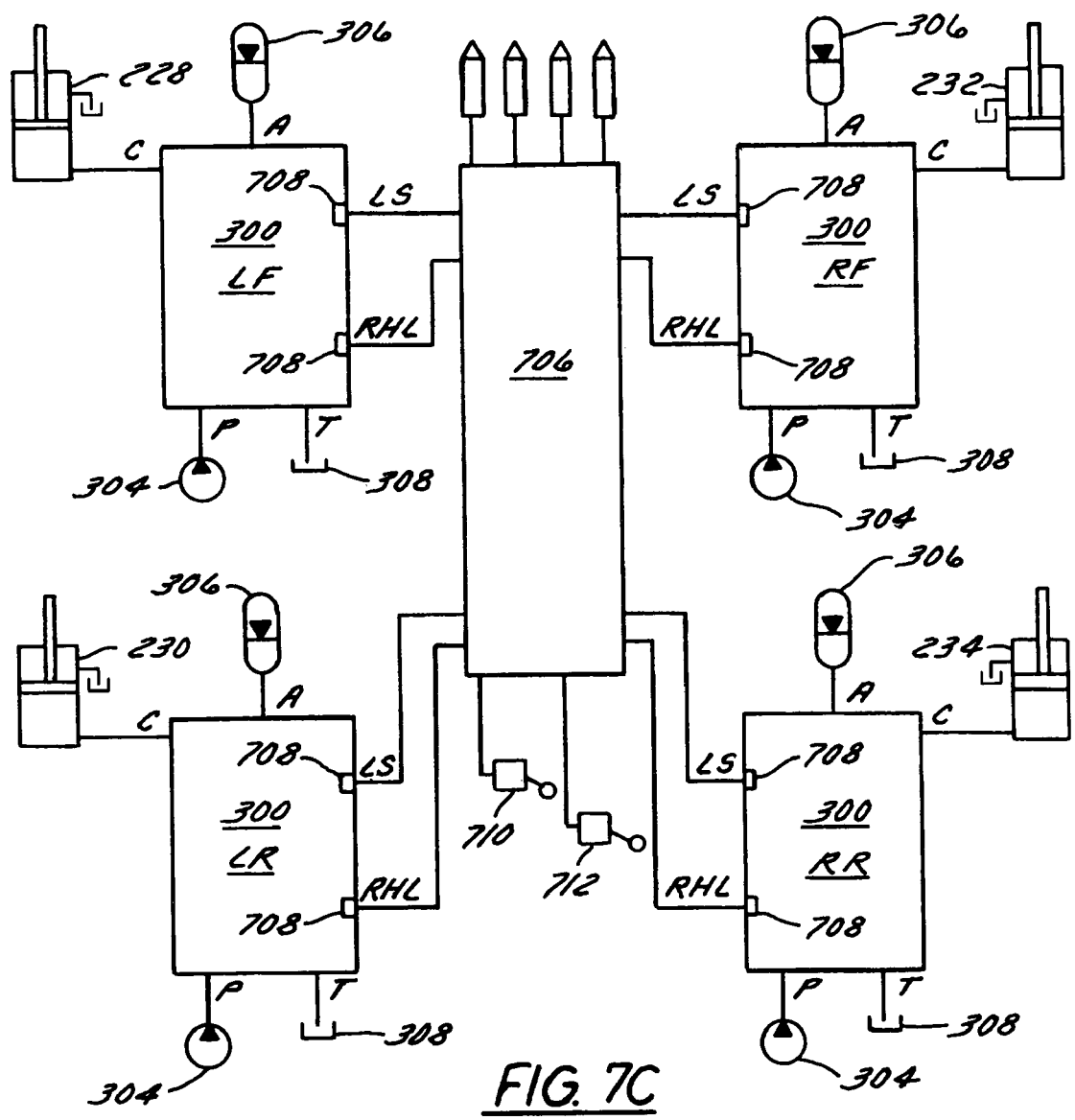

FIGS. 7A–C illustrate the three preferred embodiments of the circuits of FIGS. 4, 5, and 6, respectively, in which the lock/suspend actuators 310 and the raise/hold/lower actuators 312 are not manually operated but are electrically operated by microcontrollers 702, 704, and 706, respectively. In all other respects the circuits pictured in FIGS. 7A, 7B and 7C are the same (and are operated the same) as their corresponding manually operated circuits pictured in FIGS. 4, 5, and 6, respectively.

In FIGS. 7A–C, each hydraulic circuit 300 (identified alternatively as 300, 300F, 300R, 300LF, 300RF, 300LR, and 300RR) are coupled together and operated not manually by the operator but by microcontrollers 702, 704, 706. Microcontrollers 702, 704, 706 are electrically coupled to and drive solenoids 708. Solenoids 708 in turn are mechanically coupled to and drive the lock/suspend actuators and the raise/hold/lower actuators of each of the circuits 300.

Each of microcontrollers 702, 704 and 706 includes a raise/hold/lower operator input device 710, and a lock/suspend operator input device 712. These devices may include joysticks, switches, potentiometers, resistors, shaft encoders, rotary encoders, levers, knobs, dials, hall-effect devices, wires, cables, mechanical links or equivalent structures that collectively translate physical movement into an electrical signal readable by microcontrollers 702, 704, and 706.

Microcontrollers 702, 704, and 706 are configured to respond to operation of the lock/suspend input device 712 by generating an electrical signal and applying it to solenoids 708 coupled to the lock/suspend actuators (the "LS" connections on the circuits 300). By manipulating the lock/suspend input device 712, the operator can select either the lock position or the suspend position of all the lock/suspend valves 314 (see FIG. 3) of the circuits 300 being controlled. The system of FIG. 7A has one lock/suspend valve 314. The system of FIG. 7B has two lock/suspend valves 314, and the system of FIG. 7C has four lock/suspend valves 314.

In a similar fashion, microcontrollers 702, 704, and 706 are configured to respond to operation of the raise/hold/lower input device 710 by generating an electrical signal and applying it to solenoids 708 coupled to the raise/hold/lower actuators (the "RHL" connection on circuits 300). By manipulating the raise/hold/lower input device 710 the operator can select either the raise position, the hold position, or the lock position of all the raise/hold/lower valves 318 (see FIG. 3) of the circuits being controlled. The system of FIG. 7A has one raise/hold/lower valve 318. The system of FIG. 7B has two raise/hold/lower valves 318. The system of FIG. 7C has four raise/hold/lower valves 318.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

The invention claimed is:

1. A locking anti-motion suspension circuit for a work vehicle having a chassis, a control arm pivotally coupled to the chassis and a ground-engaging wheel coupled to the control arm, the vehicle including at least one hydraulic cylinder that is coupled to and between the control arm and the chassis to control the position of the wheel with respect to the chassis, the circuit comprising:

a gas-charged accumulator selectively connectable to said cylinder to absorb vehicular shocks by receiving hydraulic fluid ejected from said cylinder during travel over the ground;

a first hydraulic valve controllable to selectively connect said cylinder and said accumulator;

a hydraulic tank for receiving exhausted hydraulic fluid;

a hydraulic pump configured to provide a supply of pressurized hydraulic fluid; and a second hydraulic valve fluidly coupled to and between said tank and pump and said accumulator, said second valve being responsive to fluid pressure in said cylinder and fluid pressure in said accumulator to maintain said fluid pressure in said accumulator equal to said fluid pressure in said cylinder.

2. The suspension circuit of claim 1, further comprising a third hydraulic valve coupled to and between said tank and pump and said cylinder, said third valve being operable to selectively raise said chassis by filling said cylinder from said pump, to lower said chassis by emptying said cylinder to said tank.

3. The suspension circuit of claim 2, wherein said first valve is configured to simultaneously connect said accumulator to said second valve and disconnect said accumulator from said cylinder and to simultaneously connect said accumulator to said cylinder and to disconnect said accumulator from said second valve.

4. The suspension circuit of claim 3, wherein said third valve is configured manually (1) to connect said pump to said cylinder when said first valve has disconnected said accumulator from said cylinder and (2) to connect said pump to both said cylinder and said accumulator when said first valve has connected said cylinder and said accumulator.

5. The suspension circuit of claim 4, wherein said second valve is pilot operated by hydraulic signals transmitted from said cylinder and by hydraulic signals transmitted from said accumulator, and further wherein said second valve couples said accumulator to said pump when said accumulator pressure is lower than said cylinder pressure, and wherein said second valve connects said accumulator to said tank when said accumulator pressure is higher than said cylinder pressure.

6. The suspension circuit of claim 5, wherein said first valve effectively locks said cylinder when it disconnects said accumulator from said cylinder and wherein said third valve is in a hold position.

7. The suspension circuit of claim 6, wherein said first valve is manually operable to lock said cylinder and release said cylinder by manually moving a valve element of said first valve from a first position in which flow between said cylinder and said accumulator is blocked and flow between said cylinder and said accumulator is permitted.

8. A suspension for a skid steer vehicle having a chassis, comprising:
   a control arm pivotally coupled to the chassis;
   a ground-engaging wheel coupled to the control arm; and
   a locking anti-motion hydraulic circuit, said circuit comprising:
   a hydraulic suspension cylinder coupled to and between the control arm and the chassis to control the position of the wheel with respect to the chassis:
   a gas-charged accumulator in fluid communication with said cylinder to absorb vehicular shocks and provide suspension springing;
   a lock/suspend hydraulic valve manually controllable to connect said cylinder and said accumulator;
   a hydraulic tank for receiving exhausted hydraulic fluid;
   a hydraulic pump configured to provide a supply of pressurized hydraulic fluid; and
   a pressure equalization hydraulic valve fluidly coupled to and between said tank and pump and said accumulator to regulate the flow of hydraulic fluid to and from said accumulator, said second valve being responsive to fluid pressure in said cylinder and in said accumulator to maintain fluid pressure in said accumulator equal to fluid pressure in said cylinder.

9. The suspension of claim 8, further comprising a raise/hold/lower hydraulic valve coupled to and between said tank and pump and said cylinder, said raise/hold/lower valve being operable to selectively raise said chassis by filling said cylinder from said pump and to lower said chassis by emptying said cylinder to said tank.

10. The suspension of claim 9, wherein said lock/suspend valve is configured (1) to simultaneously make a connection between said accumulator to said pressure equalization valve and disconnect said accumulator from said cylinder and (2) to simultaneously connect said accumulator to said cylinder and to break a connection between said accumulator and said pressure equalization valve.

11. The suspension of claim 10, wherein said raise/hold/lower valve is configured manually (1) to connect said pump to said cylinder when said lock/suspend valve has disconnected said accumulator from said cylinder, and (2) to connect said pump to both said cylinder and said accumulator when said lock/suspend valve has connected said cylinder and said accumulator.

12. The suspension of claim 11, wherein said pressure equalization valve is pilot operated by hydraulic signals transmitted from said cylinder and by hydraulic signals transmitted from said accumulator, and further wherein said pressure equalization valve couples said accumulator to said pump when said accumulator pressure is lower than said cylinder pressure, and wherein said pressure equalization valve connects said accumulator to said tank when said accumulator pressure is higher than said cylinder pressure.

13. The suspension of claim 12, wherein said lock/suspend valve effectively locks said cylinder when it disconnects said accumulator from said cylinder and wherein said raise/hold/lower valve is in a hold position.

14. The suspension of claim 13, wherein said lock/suspend valve is manually operable to lock said cylinder and release said cylinder by manually moving a valve element of said lock/suspend valve from a first position in which flow between said cylinder and said accumulator is blocked and flow between said cylinder and said accumulator is permitted.

* * * * *